United States Patent
Tamenaga et al.

(10) Patent No.: US 8,337,091 B2
(45) Date of Patent: Dec. 25, 2012

(54) BEARING STRUCTURE AND RETAINER OF BEARING

(75) Inventors: Jun Tamenaga, Obu (JP); Takato Sugino, Obu (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 279 days.

(21) Appl. No.: 12/778,546

(22) Filed: May 12, 2010

(65) Prior Publication Data

US 2010/0290729 A1 Nov. 18, 2010

(30) Foreign Application Priority Data

May 13, 2009 (JP) ................................. 2009-116902

(51) Int. Cl.
*F16C 33/48* (2006.01)
(52) U.S. Cl. ...................................................... 384/572
(58) Field of Classification Search ........... 384/572–580
See application file for complete search history.

(56) References Cited

U.S. PATENT DOCUMENTS

| 5,343,991 | A  | * | 9/1994 | Premiski et al. | ............. | 384/572 |
| 6,238,098 | B1 | * | 5/2001 | Knoll et al. | .................. | 384/572 |
| 7,361,119 | B2 | * | 4/2008 | Tanaka et al. | ................. | 384/572 |
| 2003/0142893 | A1 | * | 7/2003 | Joki et al. | ...................... | 384/572 |
| 2008/0223161 | A1 | * | 9/2008 | Detleffsen | .................... | 384/572 |

FOREIGN PATENT DOCUMENTS

| CN | 1456822 A | 11/2003 |
| DE | 1933388 U | 2/1966 |
| DE | 10002026 A1 | 8/2001 |
| DE | 102010008550 A1 | 10/2010 |
| JP | 35-14806 | 10/1960 |
| JP | 2006-046596 A | 8/2004 |
| JP | 2006-046596 A | 2/2006 |
| JP | 2006-292065 A | 10/2006 |
| JP | 2007-240003 | 9/2007 |
| JP | 2007-240003 A | 9/2007 |
| WO | 2007/031189 A1 | 3/2007 |

\* cited by examiner

*Primary Examiner* — Thomas R Hannon
(74) *Attorney, Agent, or Firm* — Squire Sanders (US) LLP

(57) ABSTRACT

A bearing structure where a plurality of bearings is disposed in line in an axial direction, the bearing structure having the plurality of bearings of which at least one set of adjacent bearings include rollers and retainers, respectively. Portions of the respective retainers of at least one set of the adjacent bearings are disposed so as to overlap each other in a radial direction.

7 Claims, 7 Drawing Sheets

BEARING STRUCTURE AND RETAINER OF BEARING

BACKGROUND OF THE INVENTION

1. Field of the Invention

The present invention relates to a bearing structure, and more particularly, to a bearing structure and a retainer of a bearing suitable for a device where a plurality of bearings is disposed in line in an axial direction.

This application is based upon and claims the benefit of priority from Japanese Patent Application No. 2009-116902, filed on May 13, 2009, the entire contents of which are incorporated herein by reference.

2. Description of Related Art

A power transmission device where a plurality of bearings is disposed in line in an axial direction is disclosed in JP-A-2007-240003 (FIG. 3).

As shown in FIG. 7, in the power transmission device, a plurality of (two in a disclosed example) eccentric bodies 4 and 6, whose outer peripheries are eccentric with respect to an axis O1 of an input shaft 2, is disposed in line in an axial direction of the input shaft 2. Bearings 8 and 10 are disposed on the outer peripheries of the eccentric bodies 4 and 6, respectively, so as to be arranged in line. External gears 12 and 14 are disposed on the outer peripheries of the bearings 8 and 10, respectively. As the eccentric bodies 4 and 6 are rotated, the (two) external gears 12 and 14 are oscillated with a phase difference of 180°. The external gears mesh with the inner portion of an internal gear (not shown).

The bearings 8 and 10 include needle-like rollers 20 and 22 and retainers 24 and 26, respectively. Both end faces of the needle-like rollers 20 and 22 in the axial direction are pressed by pressing portions 24A, 24B, 26A, and 26B of the retainers 24 and 26, respectively. The adjacent pressing portions 24B and 26A of the pressing portions 24A, 24B, 26A, and 26B come into contact with each other, so that the retainers 24 and 26 are positioned in the axial direction.

However, since the adjacent pressing portions 24B and 26A of the retainers 24 and 26 come into contact with each other in the bearing structure in the related art, the lengths of the needle-like rollers 20 and 22 in the axial direction are decreased by the thicknesses of the pressing portions 24A and 24B or the pressing portions 26A and 26B in the axial direction. As a result, there have been problems in that allowable torque is decreased by as much as the decrease in the thicknesses, the lifespan is shortened, and the support stability also deteriorates.

However, in order to avoid these problems, if the lengths of the needle-like rollers in the axial direction are set to be increased, the length of the entire bearing structure in the axial direction is increased by as much as the increased length. As a result, the length of a device where the bearing structure is assembled is increased in the axial direction.

SUMMARY OF THE INVENTION

It is desirable to prevent the increase in the length of the entire bearing structure in an axial direction while securing a long length of a roller.

According to an embodiment of the invention, there is a bearing structure where a plurality of bearings is disposed in line in an axial direction. At least one set of adjacent bearings of the plurality of bearings includes rollers and retainers, respectively. Portions of the respective retainers of at least one set of the adjacent bearings are disposed so as to overlap each other in a radial direction. Accordingly, the above-mentioned problems are solved.

In the embodiment of the invention, focus has been placed on the fact that the pressing portion of the retainer, which presses the end face of the roller, does not need to necessarily press the "entire surface" of the end face of the roller. From this viewpoint, the retainers of adjacent bearings are disposed so as to overlap with each other in the radial direction in this embodiment of the invention.

Various methods to be described below are considered as a specific method of achieving this disposition. Meanwhile, in brief, there is a method of using specific spaces in an axial direction as spaces that are common to the pressing portions of the retainers existing on both sides of the axial direction. For this reason, unlike the configuration where spaces corresponding to two pressing portions in an axial direction are required in the past, a space corresponding to only one pressing portion is required. Further, a floating space may be devoted to the extension of the length of a roller or may be used for the reduction in the length of a power transmission device, where bearings are assembled, in an axial direction.

Meanwhile, the concept of the "roller" of the embodiment of the invention includes the concept of a so-called "needle".

According to an embodiment of the invention, it may be possible to reduce the length of a retainer in an axial direction in a bearing structure. As a result, it may be possible to secure a long length of a roller or to further reduce the length of the entire device, where the bearing is assembled, in an axial direction.

BRIEF DESCRIPTION OF THE DRAWINGS

FIG. 2 shows the shape of a bearing, wherein FIG. 2A is a left side view, FIG. 2B is a front view, and FIG. 2C is a right side view.

FIG. 3 shows the shape of the bearing, wherein FIG. 3A is a front view, FIG. 3B is a cross-sectional view taken along a line IIIB-IIIB, and FIG. 3C is a cross-sectional view taken along a line IIIC-IIIC.

DETAILED DESCRIPTION OF THE INVENTION

One example of an embodiment of the invention will be described below with reference to drawings.

Figure 1:
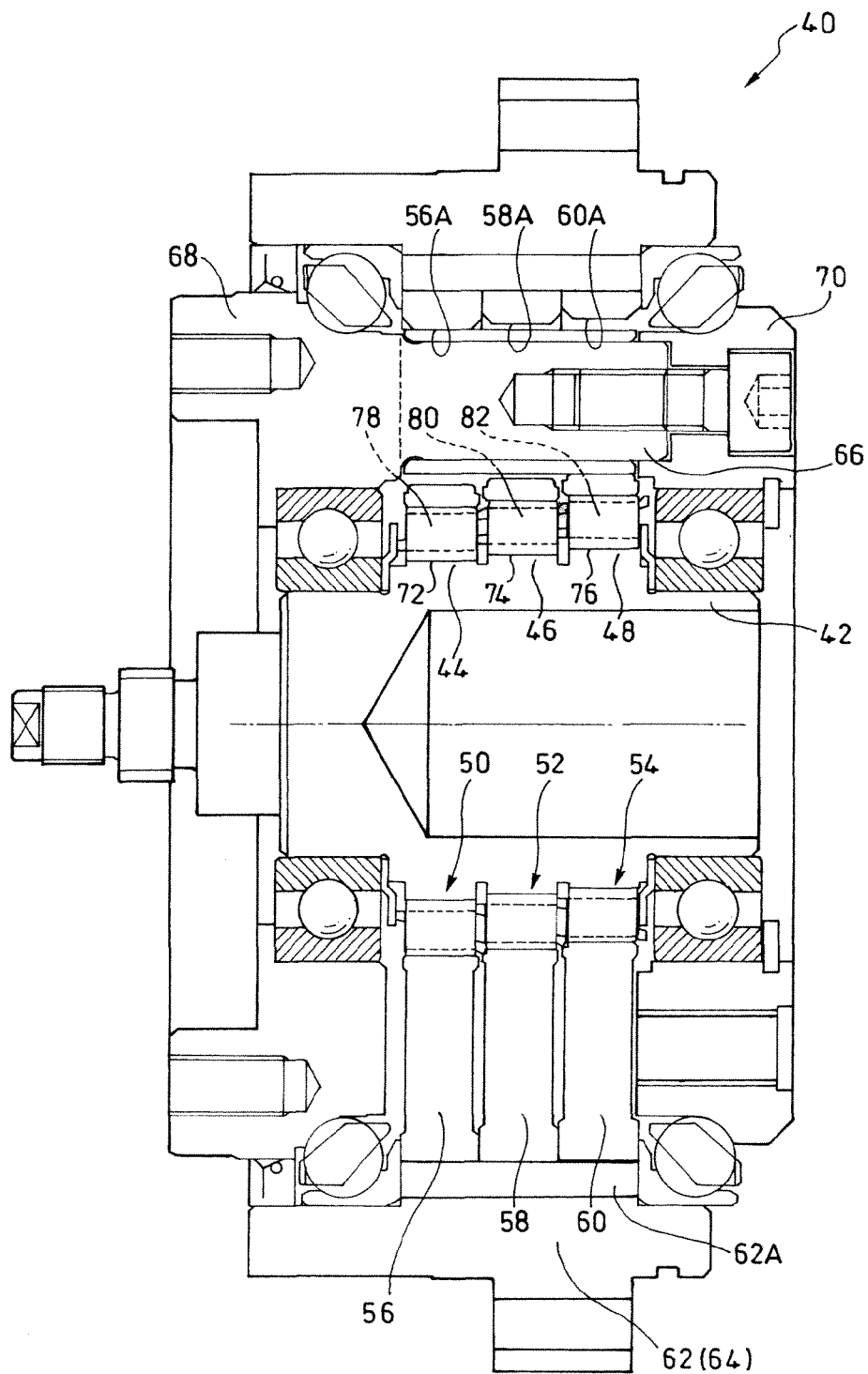
FIG. 1 is a cross-sectional view of a power transmission device according to an embodiment of the invention.

FIG. 1 is a cross-sectional view of a speed reducer (power transmission device) 40 to which an example of an embodiment of the invention is applied.

The speed reducer 40 is a so-called inner gearing planetary gear mechanism type power transmission device including an input shaft 42; three eccentric bodies 44, 46, and 48 that are formed integrally with the input shaft 42; bearings 50, 52, and 54 that are assembled with the outer peripheries of the eccentric bodies 44, 46, and 48, respectively; three external gears 56, 58, and 60 that are assembled with the outer peripheries of the bearings 50, 52, and 54, respectively; and one internal gear 62 of which the inner portion simultaneously meshes with the external gears 56, 58, and 60.

The eccentric phases of the eccentric bodies 44, 46, and 48, which are formed integrally with the input shaft 42, are shifted in a circumferential direction by 120°. The three bearings 50, 52, and 54, which are assembled with the outer peripheries of the respective eccentric bodies 44, 46, and 48, are finally arranged in line in an axial direction.

Internal teeth of the internal gear 62 are formed of columnar outer pins 62A. The number of the teeth of the internal gear 62 is set to be larger than that of each of the external gears 56, 58, and 60 by "1". The internal gear 62 is formed integrally with a casing 64 in this embodiment.

Inner pin holes 56A, 58A, and 60A are formed at the external gears 56, 58, and 60, respectively, and an inner pin 66 is loosely fitted to and passes through the inner pin holes 56A, 58A, and 60A. First and second flange bodies 68 and 70 are disposed on both sides of the three external gears 56, 58, and 60 in the axial direction so as to freely rotate with respect to the input shaft 42 and the casing 64. The inner pin 66 is connected to or formed integrally with the first and second flange bodies 68 and 70.

The speed reducer 40 has the above-mentioned configuration, so that the rotational speed of the input shaft 42 may be considerably reduced and then output from the first flange body 68. Meanwhile, the design of the speed reducer may be modified so that the reduced rotational speed is output from the second flange body 70 or the casing 64.

Figure 2:
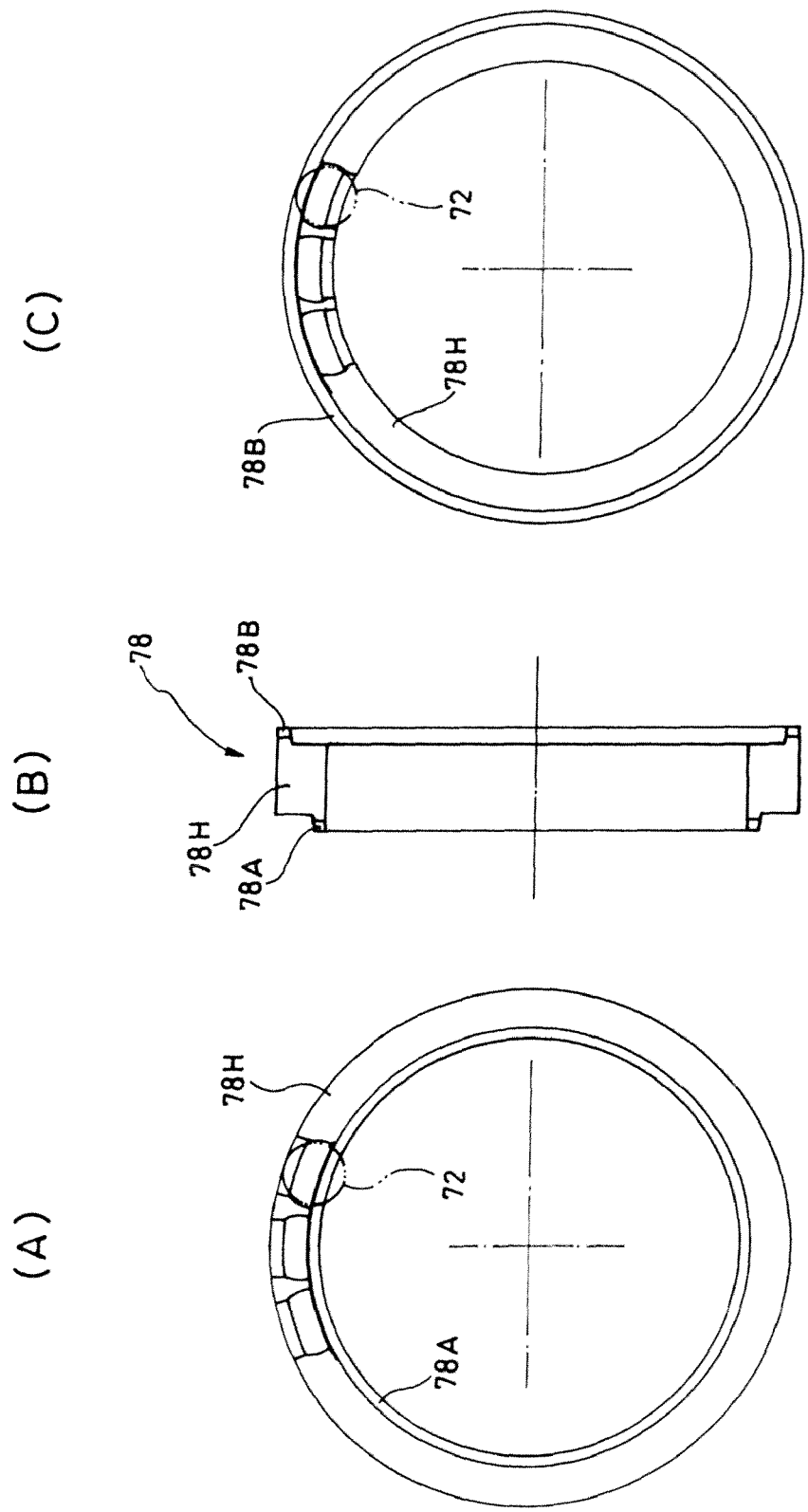
Figure 3:
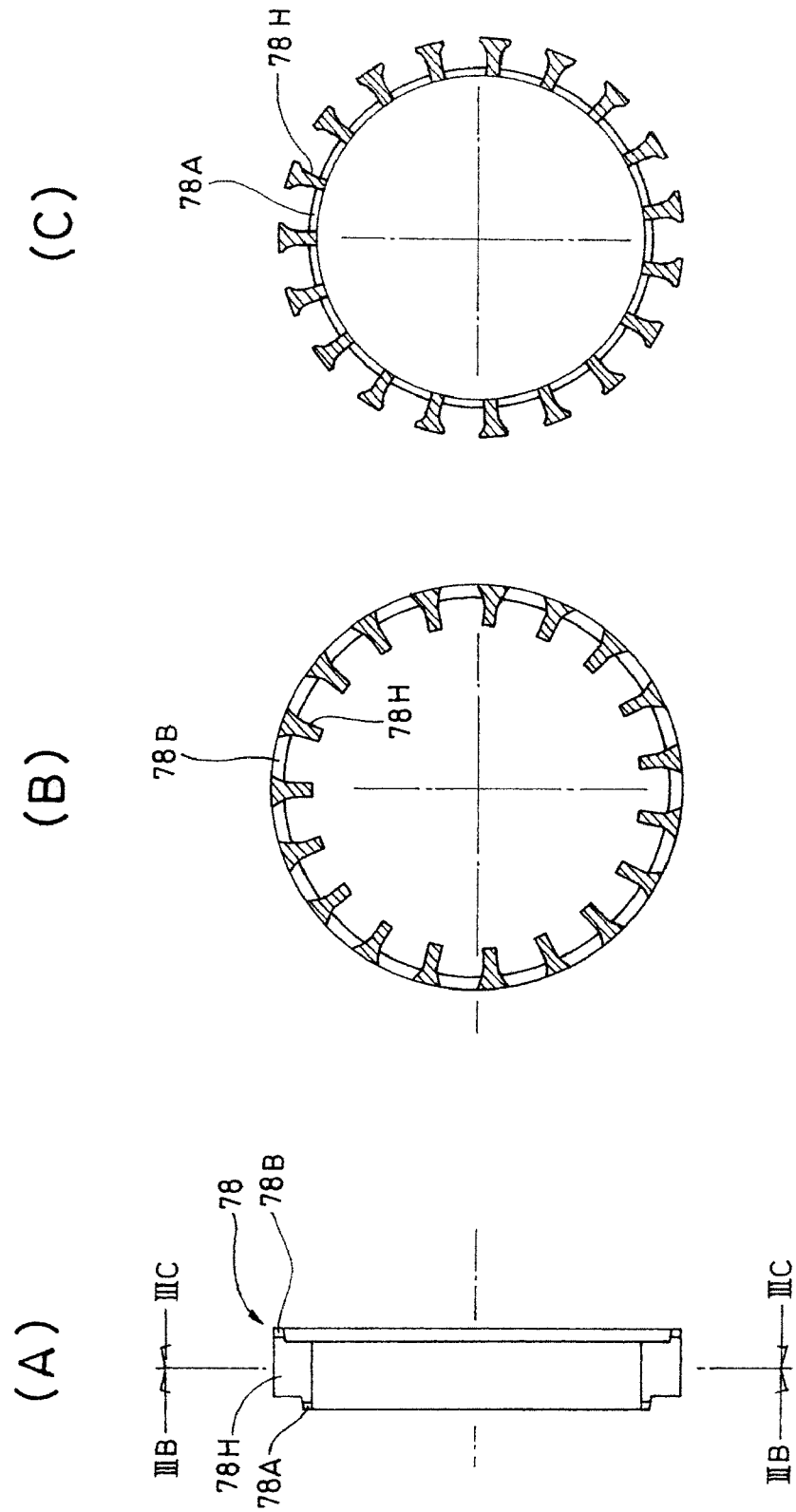
Figure 4:
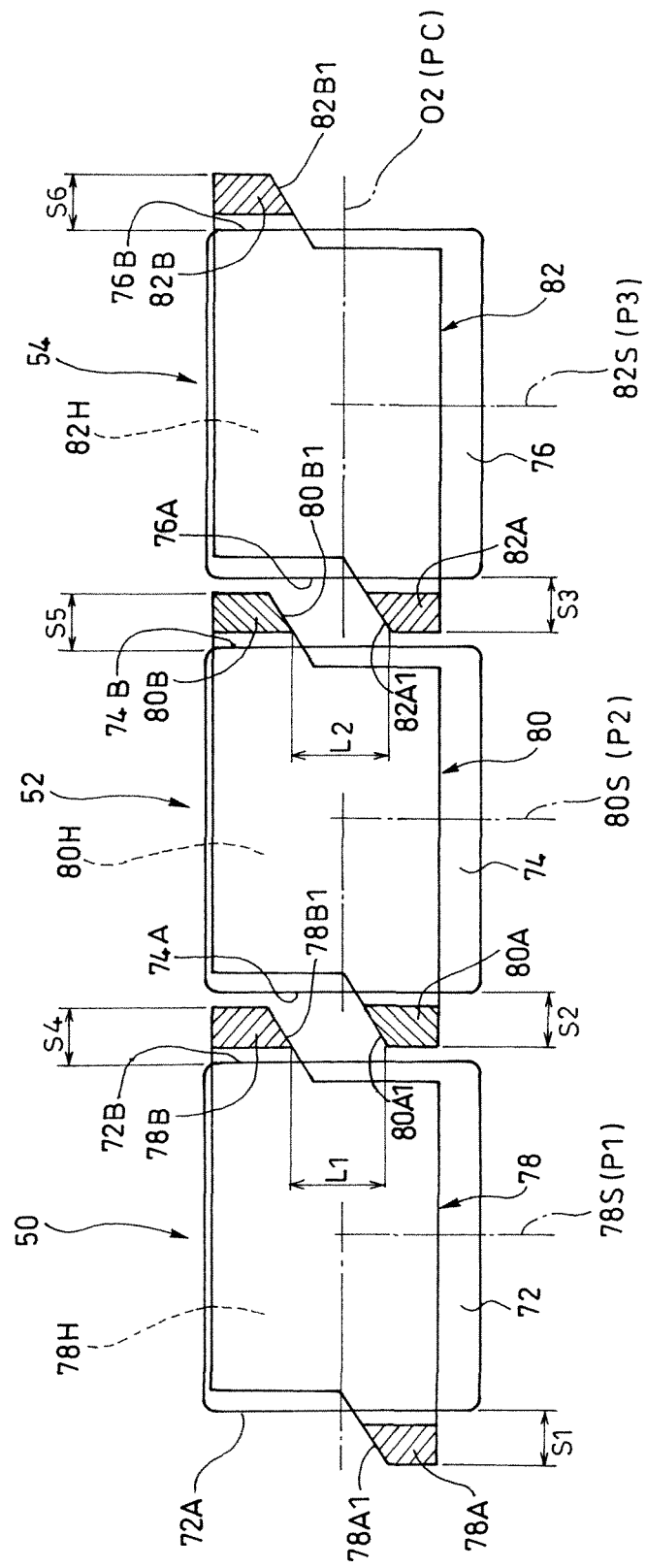
FIG. 4 is a partially enlarged view schematically showing that three bearings are arranged in line.

The bearings 50, 52, and 54 includes rollers 72, 74, and 76, and retainers 78, 80, and 82, respectively. The respective bearings 50, 52, and 54 have the same shape. However, identifiers of "first to third" are given to the respective bearings (including the rollers and the retainers) from the left side of FIG. 1 in the following description for convenience sake. FIG. 2 representatively shows the shape of the first retainer 78 of the first bearing 50. Further, FIG. 3 shows the cross-sections of the first bearing 50 taken along lines IIIB-IIIB and IIIC-IIIC. FIG. 4 is an enlarged view schematically showing that the first to third bearings 50, 52, and 54 are arranged in line in the axial direction. Meanwhile, for convenience of description, eccentricities caused by the eccentric bodies 44, 46, and 48 are not shown in FIG. 4.

The lengths of the first to third rollers 72, 74, and 76 in the axial direction are equal to the widths of the external gears 56, 58, and 60 in the axial direction. The first to third retainers 78, 80, and 82 include holding portions 78H, 80H, and 82H, first pressing portions 78A, 80A, and 82A, and second pressing portions 78B, 80B, and 82B, respectively. The holding portions 78H, 80H, and 82H hold the first to third rollers 72, 74, and 76 in a radial direction. The first pressing portions 78A, 80A, and 82A connect the holding portions 78H, 80H, and 82H, respectively, and press (position) first end faces 72A, 74A, and 76A of the first to third rollers 72, 74, and 76. The second pressing portions 78B, 80B, and 82B connect the respective holding portions 78H, 80H, and 82H on the sides opposite to the first pressing portions 78A, 80A, and 82A in the axial direction, respectively, and press (position) second end faces 72B, 74B, and 76B of the first to third rollers 72, 74, and 76.

In particular, as apparent from FIG. 4, according to this embodiment, outer peripheries 78A1, 80A1, and 82A1 of the first pressing portions 78A, 80A, and 82A are positioned inside inner peripheries 78B1, 80B1, and 82B1 of the second pressing portions 78B, 80B, and 82B in the first to third retainers 78, 80, and 82. For this reason, when the first and second bearings 50 and 52 are arranged in line, the outer periphery 80A1 of the first pressing portion 80A of the second retainer 80 may be positioned inside the inner periphery 78B1 of the second pressing portion 78B of the first retainer 78 in the radial direction. Likewise, the outer periphery 82A1 of the first pressing portion 82A of the third retainer 82 may be positioned inside the inner periphery 80B1 of the second pressing portion 80B of the second retainer 80 in the radial direction. That is, the second pressing portion 78B of the first retainer 78 and the first pressing portion 80A of the second retainer 80 may be disposed so as to overlap with each other in the radial direction, and the second pressing portion 80B of the second retainer 80 and the first pressing portion 82A of the third retainer 82 may be disposed so as to overlap with each other in the radial direction.

In other words, in this embodiment, the shapes of the first pressing portions 78A, 80A, and 82A and the second pressing portions 78B, 80B, and 82B of the first to third retainers 78, 80, and 82 are not symmetric with respect to planes P1 to P3 perpendicular to an axis O2 that includes the centers 78S, 80S, and 82S of the respective first to third retainers 78, 80, and 82 in the axial direction. Further, the first pressing portions 78A, 80A, and 82A and the second pressing portions 78B, 80B, and 82B of the first to third retainers 78, 80, and 82 are formed at positions deviated from pitch circles PC of the first to third rollers 72, 74, and 76.

The first and second retainers 78 and 80 overlap with each other and the second and third retainers 80 and 82 overlap with each other with gaps L1 and L2 (see FIG. 4: the gaps have been shown to be different depending on the angles of the eccentric bodies shown in FIG. 1, but L1 is equal to L2 in this embodiment) in the radial direction. The gaps L1 and L2 are determined from the eccentric phases and eccentricities of the first to third eccentric bodies 44, 46, and 48. Specifically, each of the gaps is set to a value that is larger than a radial component of the sum of the eccentricities of adjacent eccentric bodies. The reason for this is that it is necessary to set each of the gap L1 or L2 to a value equal to or larger than the degree of the eccentricity between adjacent eccentric bodies (a distance between the axes of the eccentric bodies caused by the eccentricity) in order to prevent the interference between the inner periphery 78B1 of the second pressing portion 78B of the first retainer 78 and the outer periphery 80A1 of the first pressing portion 80A of the second retainer 80 or the interference between the inner periphery 80B1 of the second pressing portion 80B of the second retainer 80 and the outer periphery 82A1 of the first pressing portion 82A of the third retainer 82. In this regard, specifically, assuming that each of the eccentricities of the first to third eccentric bodies 44, 46, and 48 is denoted by "e", the gaps L1 and L2 are set to be larger than "e×cos 30°×2≈1.732e (1.732 times of e)" in this embodiment since the eccentric phases of the first to third eccentric bodies 44, 46, and 48 are shifted by 120°. Meanwhile, if only two external gears are provided and a difference between the eccentric phases of the (adjacent) eccentric bodies is 180°, "2e (two times of e)" is referred to as the lowest reference gap. Further, if four external gears are provided and a difference between the eccentric phases of the (adjacent) eccentric bodies is 90°, "e×cos 45°×2≈1.414e (1.414 times of e)" is referred to as the lowest reference gap. Reversely, if the gaps L1 and L2 are set to be equal to or larger than "2e", it may be possible to convert the retainer regardless of the eccentric phase.

Furthermore, the protruding lengths S1 to S3 of the first pressing portions 78A, 80A, and 82A of the first to third retainers 78, 80, and 82, which protrude from the first end faces 72A, 74A, and 76A of the first to third rollers 72, 74, and 76, and the protruding lengths S4 to S6 of the second pressing portions 78B, 80B, and 82B, which protrude from the second end faces 72B, 74B, and 76B of the first to third rollers 72, 74, and 76, are set to the same lengths.

Each of the gaps is largely shown in FIG. 4 for the sake of convenience. However, if the protruding lengths S2 and S4 are particularly equal to each other in this configuration, the second pressing portion 78B of the first retainer 78 may come into contact with the first end face 74A of the second roller 74 and has a function to position the second roller 74 in the axial direction. Further, the first pressing portion 80A of the second retainer 80 may come into contact with the second end face 72B of the first roller 72 and has a function to position the first roller 72. Likewise, if the protruding lengths S3 and S5 are equal to each other, the second pressing portion 80B of the second retainer 80 may come into contact with the first end face 76A of the third roller 76 and has a function to position the third roller 76 in the axial direction. Furthermore, the first pressing portion 82A of the third retainer 82 may come into contact with the second end face 74B of the second roller 74 and has a function to position the second roller 74.

In this embodiment, as described above, the first to third retainers 78, 80, and 82 are disposed so that portions of the first to third retainers (specifically, the second pressing portion 78B of the first retainer 78, the first pressing portion 80A of the second retainer 80, the second pressing portion 80B of the second retainer 80, and the first pressing portion 82A of the third retainer 82) are disposed so as to overlap with each other in the radial direction. Accordingly, each space between the first to third rollers 72, 74, and 76 in the axial direction is the same as a space corresponding to one pressing portion. For this reason, it may be possible to reduce the space corresponding to one pressing portion in the axial direction in comparison with the structure in the related art where each of the pressing portions has an independent space in the axial direction.

Further, the first to third rollers 72, 74, and 76 have lengths in the axial direction that are equal to the widths of the external gears 56, 58, and 60 in the axial direction. Accordingly, the first to third rollers have high strength (long life) and also have high stability in supporting the external gears 56, 58, and 60. Even though the roller employed in JP-A-2007-240003 (FIG. 3) is used (even when the configuration where the pressing portion does not protrude from the external gear in the axial direction is employed), the length of the roller may be increased in the axial direction.

Furthermore, (although reference numerals are omitted) as described above, the adjacent pressing portions have functions to press not only the roller of the bearing but also the adjacent roller. Accordingly, it may be possible to more reliably position each of the rollers.

Since the shape of a die may be very simplified when the bearing is manufactured, it may be possible to obtain a merit of reducing manufacturing cost as another practical merit. In the case of the shape of the retainer in the related art, it was not possible to manufacture the retainer by pulling (separating) two dies in the axial direction. For this reason, a method of separating dies in a radial direction should be used. As a result, the number of dies was large and the structure thereof was also complicated. In this embodiment, for example, it may be possible to manufacture the first bearing 50 by preparing a first die (not shown) that includes the first pressing portion 78A and a second die (not shown) that includes the second pressing portion 78B and separating the first and second dies in the axial direction. Since each of the second and third bearings 52 and 54 is also the same as the first bearing, it may be possible to naturally manufacture the second and third bearings by the same method.

Meanwhile, the configuration of the speed reduction mechanism of the invention is not limited to the configuration of the embodiment. Further, the shape of the retainer is also not limited to the above-mentioned shape.

Figure 5:
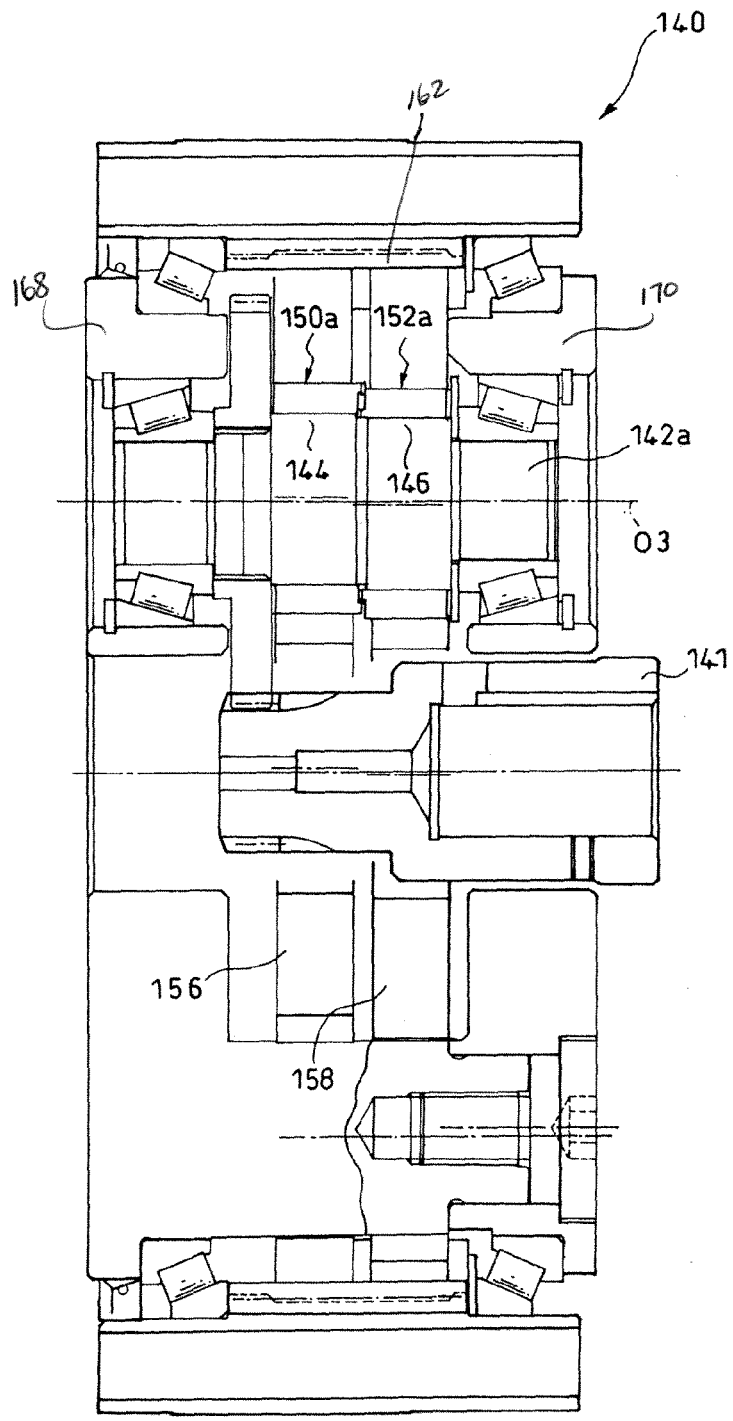
FIG. 5 is a cross-sectional view of a power transmission device according to another embodiment of the invention that corresponds to FIG. 1.
Figure 6:
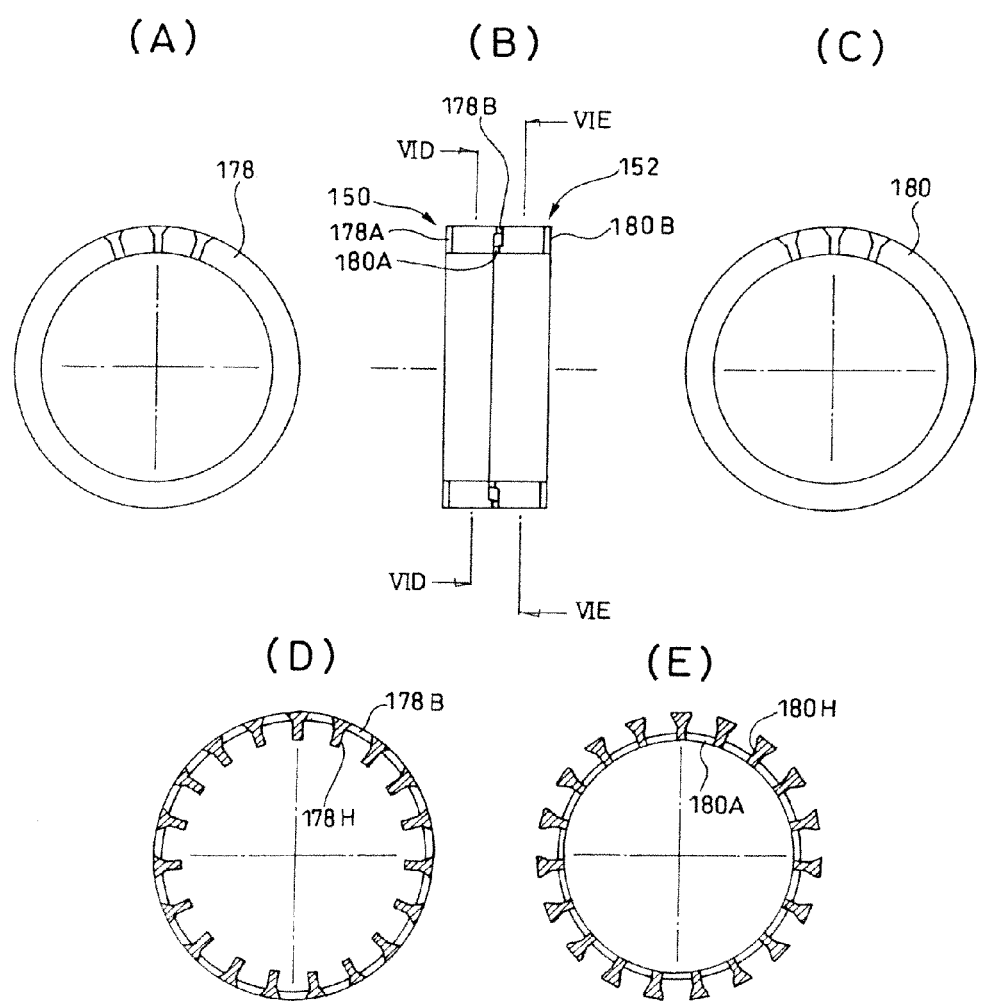
FIG. 6A is a left side view of a bearing according to another embodiment.
FIG. 6B is a front view of the bearing.
FIG. 6C is a right side view of the bearing.
FIG. 6D is a cross-sectional view taken along a line VID-VID.
FIG. 6E is a cross-sectional view taken along a line VIE-VIE.
Figure 7:
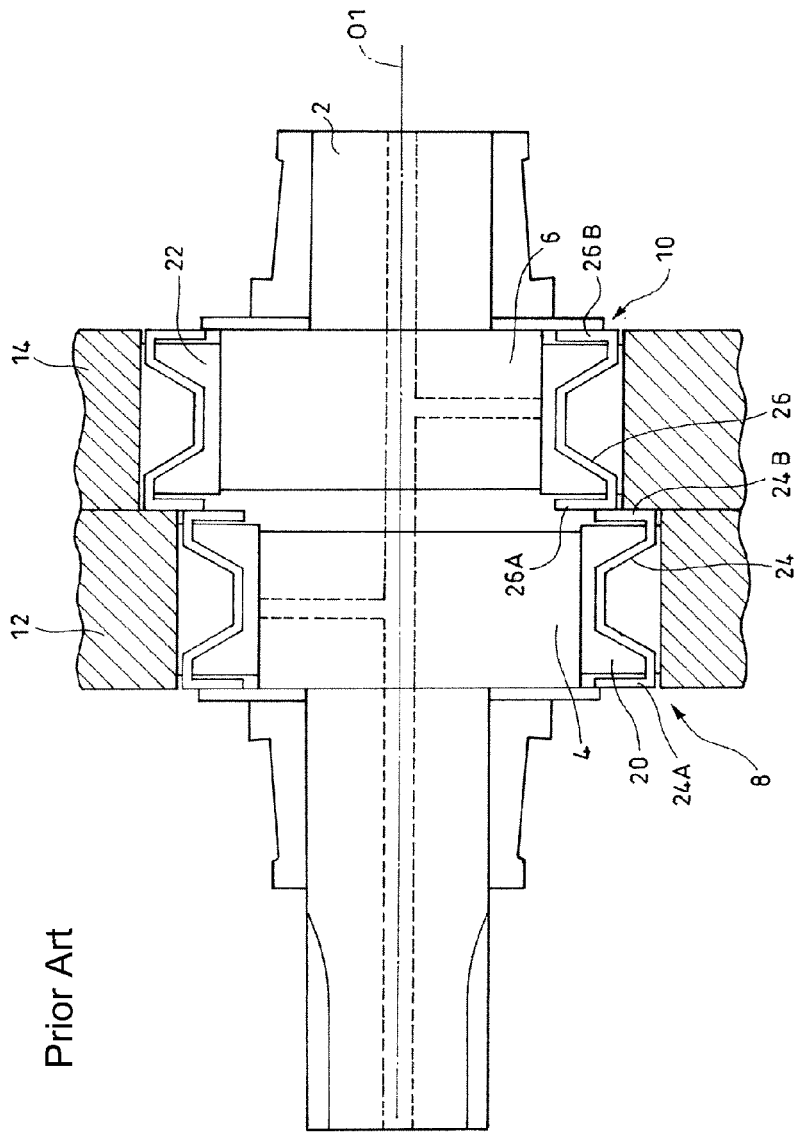
FIG. 7 is a cross-sectional view of an example of a power transmission device in the related art.

FIGS. 5 and 6 show an example of another embodiment of the invention.

A speed reduction mechanism, which is employed in a power transmission device 140 according to this embodiment, is basically the same as the speed reduction mechanism disclosed in the above-mentioned JP-A-2007-240003 (FIG. 3). In the power transmission device 140, a plurality of eccentric bodies 144 and 146, of which the outer peripheries are eccentric with respect to the axis O3 of the eccentric body shaft 142a, are arranged in line (two eccentric bodies are provided on one eccentric body shaft 142a in this example) in the axial direction of each of three eccentric body shafts 142a (only one of these is shown in FIG. 5) to which the rotation of an input shaft 141 is simultaneously transmitted in the same direction. Bearings 150a and 152a are disposed on the outer peripheries of the eccentric bodies 144 and 146, respectively, so as to be arranged in line in the axial direction. External gears 156 and 158 are disposed on the outer peripheries of the bearings 150a and 152a, respectively. If the three eccentric body shafts 142a are rotated at the same speed in the same direction, the eccentric bodies 144 and 146 of each of the eccentric body shafts 142a are rotated at the same speed in the same direction and the (two) external gears 156 and 158 are oscillated with a phase difference of 180°. That is, from the focusing on the first and second bearings 150a and 152a provided on each eccentric body shaft 142a, it is understood that the plurality of bearings (150a and 152a) is disposed in line in the axial direction.

If the three eccentric body shafts 142a are rotated at the same speed in the same direction due to the rotation of the input shaft 141, the eccentric bodies 144 and 146 are rotated at the same speed in the same direction and the external gears 156 and 158 mesh with the inner portion of an internal gear 162 while being oscillated. For this reason, whenever the external gears 156 and 158 are oscillated one time, the external gears 156 and 158 are rotated by an angle corresponding to a difference between the number of teeth of the external gears and the number of teeth of the internal gear 162. Then, the rotation components of the external gears are output from any one of first and second flanges 168 and 170 (from the first flange 168 in this example) in the form of the "revolution" of each eccentric body shaft 142a. As a result, a large speed reduction ratio is obtained.

Here, in this embodiment, two bearings, that is, the first and second bearings 150a and 152a are disposed in line in the axial direction like the first and second retainers 178 and 180 of the first and second bearings 150 and 152 shown in FIG. 6. The first and second retainers 178 and 180 include holding portions 178H and 180H, first pressing portions 178A and 180A, and second pressing portions 178B and 180B, respectively. In this embodiment, the first pressing portion 178A of the first retainer 178 of the first bearing 150 and the second pressing portion 180B of the second retainer 180 of the second bearing 152 are formed so as to have a general shape (so as to press the entire end portion). In addition, the second pressing portion 178B of the first retainer 178 of the first bearing 150 and the first pressing portion 180A of the second retainer 180 of the second bearing 152 are disposed so as to overlap with each other in the radial direction, so that the same advantages as those of the above-mentioned embodiment are obtained.

As described above, in brief, it is preferable that the adjacent portions of the retainers of the bearings according to the invention be disposed so as to overlap with each other in the radial direction. For example, the outermost pressing portion of the plurality of bearings, which is arranged in line, in the axial direction may be formed in an arbitrary shape.

Meanwhile, any one of the above-mentioned embodiments has had the configuration where the retainer of one adjacent bearing positions the roller corresponding to the other bearing. However, the invention may not necessarily employ this configuration (the configuration where the retainer of one bearing presses and positions the roller corresponding to the adjacent bearing). That is, even though this configuration is not used, the rollers of all bearings may be positioned. In contrast, in some cases, for example, the first end face 74A (174A) of the second roller 74(174) may be pressed by only the second pressing portion 78B(178B) of the first retainer 78(178) and the second end face 72B(172B) of the first roller 72(172) may be pressed by only the first pressing portion 180A of the second retainer 80(180). Since this configuration facilitates the management of the dimensions of a gap between the first and second pressing portions of the respective bearings and the dimensions of the roller in the axial direction (the management of the gap between the first and second pressing portions and the roller), it may be possible to obtain an advantage of making the roller be simply received (assembled) in the holding portion of the retainer.

Further, in the above-mentioned embodiments, the outer periphery of the first pressing portion is formed so as to be smaller than the pitch circle and the inner periphery of the second pressing portion is formed so as to be larger than a pitch circle, so that both of the first and second pressing portions are disposed so as to be deviated from the pitch circle. As a result, the first and second pressing portions have been disposed so to form a gap in which the pitch circle is included. However, in brief, the retainers according to the invention may be disposed so that the portions of the retainers of the adjacent bearings are disposed so as to overlap with each other in the radial direction. Accordingly, a method of forming a specific pressing portion is not necessarily limited to the example of the embodiment. For example, a) the outer periphery of the first pressing portion may be positioned on the pitch circle and the inner periphery of the second pressing portion may be larger than the pitch circle, and b) the inner periphery of the second pressing portion may be positioned on the pitch circle and the outer periphery of the first pressing portion may be smaller than the pitch circle. Further, c) the outer periphery of the first pressing portion may be further larger than the pitch circle and the inner periphery of the second pressing portion may be larger than the outer periphery of the first pressing portion (both of the outer and inner peripheries of the first pressing portion are larger than the pitch circle), or d) the outer periphery of the first pressing portion may be smaller than the pitch circle and the inner periphery of the second pressing portion may be also smaller than the pitch circle but larger than the outer periphery of the first pressing portion (both of the outer and inner peripheries of the first pressing portion are smaller than the pitch circle).

Furthermore, for example, as the "retainer as a single body", even though the first and second pressing portions are symmetrically formed, for example, if "bearings are combined and disposed" so that first and second pressing portions having a small diameter are symmetrically formed at the retainer of the first bearing, first and second pressing portions are symmetrically formed at the retainer of the second bearing so as to have a diameter larger than the diameter of the first and second pressing portions, and first and second pressing portions are symmetrically formed at the third bearing so as to have a small diameter, it may be possible to achieve the configuration according to the bearing structure of the invention where "the portions of the retainers of the adjacent bearings are disposed so as to overlap with each other in the radial direction" and, likewise, to obtain the advantages of the invention.

Meanwhile, in the above-mentioned embodiments, the bearing structure according to the invention or the retainer of the bearing has been applied to the speed reduction mechanism of the power transmission device. However, the invention is not limited to a power transmission device, and may be applied to various devices where bearings with retainers (which include rollers as rolling elements) are disposed in line in the axial direction in brief, so that the same advantages are obtained.

What is claimed is:

1. A bearing structure where a plurality of bearings is disposed in line in an axial direction, the bearing structure comprising:
   the plurality of bearings of which at least one set of adjacent bearings include rollers and retainers, respectively,
   wherein portions of the respective retainers of at least one set of the adjacent bearings are disposed so as to overlap each other in a radial direction,
   wherein the plurality of bearings is disposed between eccentric bodies and external gears of a planetary gear mechanism including a plurality of eccentric bodies of which outer peripheries are eccentric with respect to an axis, and external gears that are oscillated through the bearings on the outer peripheries of the respective eccentric bodies, and
   portions of the retainers overlap with each other with a gap in the radial direction.

2. The bearing structure according to claim 1,
   wherein the gap in the radial direction is set to a value that is larger than a radial component of the sum of eccentricities of adjacent eccentric bodies.

3. The bearing structure according to claim 1,
   wherein the retainer of one bearing of the set of bearings functions as a positioning member that positions a roller of the other adjacent bearing in the axial direction.

4. The bearing structure according to claim 1,
   wherein at least one of the retainers includes a first pressing portion that presses one end face of at least one of the rollers in the axial direction, and a second pressing portion that presses the other end face of the roller in the axial direction,
   the outer periphery of the first pressing portion is positioned inside the inner periphery of the second pressing portion in the radial direction, and
   the set of bearings are disposed so that the first pressing portion of one bearing and the second pressing portion of the other bearing are adjacent to each other.

5. A retainer of a roller bearing that supports a roller of a bearing used in the bearing structure according to claim 1, a plurality of bearings being disposed in line in an axial direction when being used, the retainer comprising:
   a first pressing portion that presses one end face of the roller in the axial direction; and
   a second pressing portion that presses the other end face of the roller in the axial direction,
   wherein the first and second pressing portions are not symmetric with respect to a plane perpendicular to an axis that includes the center of the retainer in the axial direction.

6. The retainer of a roller bearing according to claim 5, wherein the outer periphery of the first pressing portion is positioned inside the inner periphery of the second pressing portion in the radial direction.

7. A retainer of a roller bearing used in the bearing structure according to claim 1, the roller bearing for supporting the plurality of rollers that is used when a plurality of bearings is disposed in line in an axial direction, the retainer comprising:

a first pressing portion that presses one end face of the roller in the axial direction; and a second pressing portion that presses the other end face of the roller in the axial direction, wherein at least one of the first and second pressing portions is deviated from a pitch circle of the roller.

\* \* \* \* \*